(12) United States Patent
Muhammad et al.

(10) Patent No.: US 7,680,456 B2
(45) Date of Patent: Mar. 16, 2010

(54) METHODS AND APPARATUS TO PERFORM SIGNAL REMOVAL IN A LOW INTERMEDIATE FREQUENCY RECEIVER

(75) Inventors: Khurram Muhammad, Dallas, TX (US); Imtinan Elahi, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 977 days.

(21) Appl. No.: 11/059,147

(22) Filed: Feb. 16, 2005

(65) Prior Publication Data

US 2006/0183453 A1    Aug. 17, 2006

(51) Int. Cl.
*H04B 15/00* (2006.01)
*H04B 1/00* (2006.01)

(52) U.S. Cl. .............. 455/63.1; 455/283; 455/296; 455/284; 455/309; 455/310; 455/311; 455/307; 455/313; 455/323; 455/260

(58) Field of Classification Search .............. 455/283, 455/296, 63.1, 284, 309, 310, 311, 302, 67.11, 455/67.13
See application file for complete search history.

(56) References Cited

U.S. PATENT DOCUMENTS

| | | | |
|---|---|---|---|
| 5,579,347 A * | 11/1996 | Lindquist et al. | 375/346 |
| 5,603,087 A * | 2/1997 | Shultz | 455/423 |
| 6,169,912 B1 * | 1/2001 | Zuckerman | 455/570 |
| 7,277,688 B2 * | 10/2007 | Yang et al. | 455/296 |
| 7,379,503 B2 * | 5/2008 | Krumme et al. | 375/257 |
| 2006/0083335 A1 * | 4/2006 | Seendripu et al. | 375/332 |

OTHER PUBLICATIONS

Lawrence Der, Behzad Razavi, "A 2-GHz CMOS Image Reject Receiver with LMS Calibration", IEEE Journal of Solid-State Circuits, vol. 38, No. 2, Feb. 2003.

Farbod Behbahani, Yoji Kishigami, John Leete, Asad A. Abidi, "CMOS Mixers and Polyphase Filters for Large Image Rejection", IEEE Jounal of Solid-State Circuits, vol. 36, No. 6, Jun. 2001.

Isis Mikhael, Wasfy B. Mikhael, "Adaptive IQ Mismatch Cancellation for Quadrature IF Receivers", submitted to IEEE Midwest Symposium on Circuits, Aug. 2002.

Mikko Valkama, Markku Renfors, "Advanced DSP for I/Q Imbalance Compensation in a Low-IF Receiver", IEEE International Conference on Communications, 2000, pp. 768-772, Jun. 2000.

(Continued)

*Primary Examiner*—Lana N Le
*Assistant Examiner*—Ping Y Hsieh
(74) *Attorney, Agent, or Firm*—Ronald O. Neerings; Wade James Brady, III; Frederick J. Telecky, Jr.

(57) ABSTRACT

Methods, apparatus, and articles of manufacture are disclosed for removing an undesired component from a low intermediate frequency signal having an intermediate center frequency and an undesired component at a first frequency. One example method may include determining an amplitude of the undesired component; frequency shifting the low intermediate frequency signal from the intermediate center frequency to produce a zero intermediate frequency signal; filtering the zero intermediate frequency signal; generating a tone based on the amplitude of the undesired component; and subtracting the tone from the filtered zero intermediate frequency signal to remove the undesired component.

23 Claims, 5 Drawing Sheets

OTHER PUBLICATIONS

Jan Tubbax, Boris Côme, Liestbet Van der Peffe, Stéphane Donnay, Marc Engels, Claude Desset, "Joint Compensation of IQ Imbalance and Phase Noise", Vehicular Technology Conference, 2003, pp. 1605-1609, Apr. 2003.

K.P. Pun, J.E. Franca, C. Azeredo-Leme, "The Correction of Frequency-Dependent I/Q Mismatches in Quadrature Receivers by Adaptive Signal Separation", Proceedings of $4^{th}$ International Conference on ASIC, 2001, pp. 424-427.

Li Yu and W.M. Snelgrove, "A Novel Adaptive Mismatch Cancellation System for Quadrature IF Radio Receivers", IEEE Transactions on Circuits and Systems:-II: Analog and Digital Signal Processing, vol. 46, No. 6, pp. 789-801, Jun. 1999.

D.V. Compernolle and S.V. Gerven, "Signal Separation in a Symmetric Adaptive Noise Canceller by Output Decorrelation", in Proceedings of the International Conference on Acoustic Speech Signal Processing, vol. IV, pp. 221-224, Mar. 1992.

S.V. Gerven and D.V. Compernolle, "Signal Separation by Symmetric Adaptive Decorrelation: stability, convergence and uniqueness," IEEE Transactions of Signal Processing, vol. 43, No. 7, pp. 1602-1612, Jul. 1992.

Elahi et al., I/Q Mismatch Compensation in a 90nm Low-IF CMOS Receiver, Presentation, IEEE International Solid-State Circuits Conference, 2005, Session 29, 2005.

Elahi et al., I/Q Mismatch Compensation in a 90nm Low-IF CMOS Receiver, IEEE International Solid-State Circuits Conference, 2005, Session 29, 2005, pp. 19-21.

\* cited by examiner

METHODS AND APPARATUS TO PERFORM SIGNAL REMOVAL IN A LOW INTERMEDIATE FREQUENCY RECEIVER

TECHNICAL FIELD

The present disclosure pertains to communication systems and, more particularly, to methods and apparatus to perform signal removal in a low intermediate frequency (low-IF) receiver.

BACKGROUND

Figure 1:
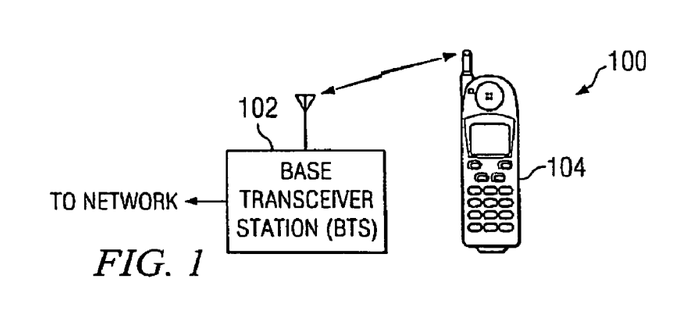
FIG. 1 is a diagram of an example communication system.

Referring to FIG. 1, a known example digital communication system 100 typically includes a base transceiver station (BTS) 102 that communicates with a communication network and one or more mobile units 104. The communication between the BTS 102 and the mobile unit 104 may be carried out using communication techniques such as code-division multiple access (CDMA), time-division multiple access (TDMA), and the like.

As will be readily appreciated by those having ordinary skill in the art, digital communication systems, such as that of FIG. 1, convert analog signals, such as voice signals, into digital audio signals, which are represented by bits. The digital audio signals are transmitted on a high frequency (HF) signal, e.g., 1800 megahertz (MHz), using digital modulation techniques such as phase shift keying (PSK), quadrature phase shift keying (QPSK), differential quadrature phase shift keying (DQPSK), and the like.

For example, with reference to FIG. 1, the BTS 102 may receive an analog voice signal from the network, wherein the voice signal is to be transmitted from the BTS 102 to the mobile unit 104. The BTS 102 samples the analog voice signal to create a corresponding digital audio signal and broadcasts the digital audio signal to the mobile unit 104 on an analog HF signal.

The mobile unit 104 typically includes a receive lineup that converts the received analog HF signal to one or more intermediate frequency (IF) signals, before converting the received signal to the digital domain (i.e., a digital signal) for processing. After the digital domain processing is complete, the digital audio signal is converted into an analog signal for presentation to a user via a speaker.

One known example receive lineup is a low-IF receive lineup, which uses an analog front end to convert an HF signal into a low-IF signal for further processing. It is a known problem that analog front ends output an undesired direct current (DC) component in addition to the received signal. The DC component may be dynamic and/or static in nature. Often times, the early stages of a receiver lineup remove the static DC component, leaving only the dynamic DC component. It is desirable to remove the DC component because the DC component reduces the dynamic range of analog-to-digital (A/D) converters, as well as degrades the performance of other components in the receive lineup. Additionally, the DC component appears as a noise contribution in detection phase of reception, thereby generating undesirable artifacts that make signal detection difficult. In particular, the DC component will appear as a tone after further mixing or down-conversion to zero-IF.

Conventional techniques for eliminating the DC component in low-IF receivers require the calculated estimation of the phase and amplitude of the tone generated by mixing the DC. This is a computationally intensive process. Other non-computationally intensive techniques pass received signals through sharp cutoff (i.e., multiple pole or high order) high-pass filters to filter out the DC component before subsequent down conversion from low-IF to zero-IF. However, due to their sharpness, such filters exhibit a non-linear phase response and large group delays at frequencies close to DC. In such systems, one approach to reducing group delay is to reduce the filter sharpness or order. However, less sharp or lower order filters attenuate useful signal energy (e.g., non DC components) and, therefore, adversely affect the signal-to-noise ratio (SNR) of the receive lineup.

Other existing solutions for addressing residual DC in a low-IF system perform DC correction on data prior to receiving an actual data burst. Such solutions are premised on the assumption that the DC signal does not change significantly during data burst reception. This is not always an accurate assumption because the DC signal may be dynamic and, therefore, based on a number of factors such as signal type, temperature, and mobile unit environment.

DETAILED DESCRIPTION

Figure 2:
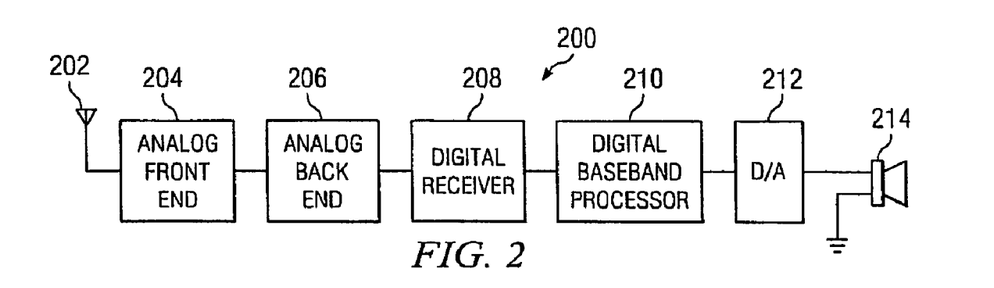
FIG. 2 is a block diagram of an example receive lineup that may be implemented in a mobile unit.

FIG. 2 illustrates a receive lineup 200, such as may be found in cellular mobile units, or in any other devices that receive and process low-IF digital communication signals. In the receive lineup 200, an antenna 202 receives HF signals (e.g., cellular, personal communication system (PCS), etc.) and couples the received signals to an analog front end 204. As described in detail below in conjunction with FIG. 3, the analog front end 204 may amplify and down convert the received signals to a low-IF signal, and provide the low-IF signal to an analog back end 206. The analog back end 206 may further amplify the low-IF signal and convert the same to a digital signal. As noted previously, such low-IF signals typically include a DC component having a dynamic portion.

After the analog processing is performed by the analog front and back ends 204, 206, the low-IF signal is coupled to a digital receiver 208, which, as described in detail below, produces zero-IF signals that are coupled to a digital baseband processor 210. As disclosed herein and described in detail below, the digital receiver 208 and the digital baseband processor 210 cooperate to remove undesirable components, such as DC, prior to signal detection, thereby eliminating the associated deleterious effects of the undesired components on the detection process. In general, the DC components are removed by averaging the DC level over a part of a received data packet obtained during a data burst reception and subtracting this average from a zero-IF version of the same signal using a coherent tone in the baseband. Accordingly, due to the operation of the low-IF receiver, any residual DC component that cannot be corrected in the receiver hardware (e.g., the analog front and back ends 204, 206) is converted to a tone when down converted to zero-IF. By computing the amplitude of the tone and setting the phase of the tone to a known value, the tone can be subtracted from the zero-IF signal.

The output of the digital baseband processor 210 is provided to a digital-to-analog converter (D/A) 212, which produces analog audio signals that may drive, directly or indirectly, a speaker 214. Of course, an amplifier, a filter, or other circuitry may be placed between the D/A 212 and the speaker 214.

Figure 3:
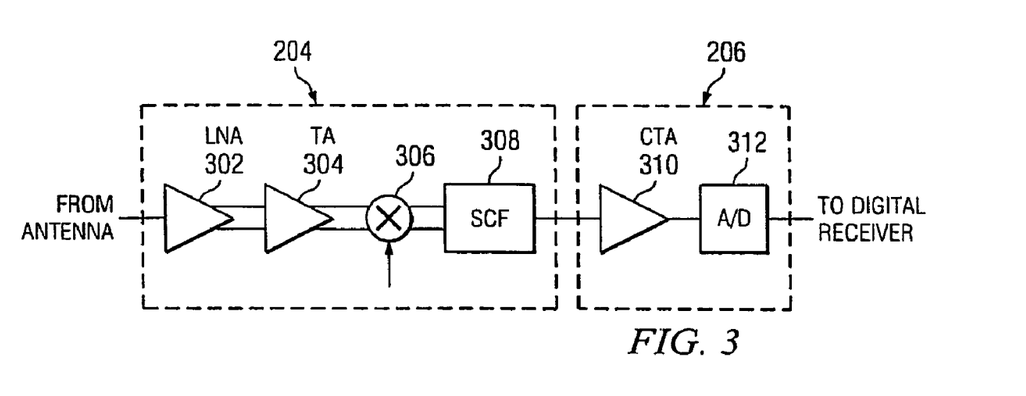
FIG. 3 is a block diagram showing additional detail of the analog front end and the analog back end of FIG. 2.

Further detail of one example implementation of a portion of the analog front end 204 is shown in FIG. 3. The antenna provides HF signals, having frequencies used by any standard cellular, PCS, or other digital communication system, to a low noise amplifier (LNA) 302. The low noise amplifier 302 is further coupled to a trans-conductance amplifier (TA) 304, which is coupled to a mixer 306. As shown in FIG. 3, the LNA 302 may output differential signals at the received RF frequency.

The output of the mixer 306, which is a differential output at an IF, is coupled to a Switched Capacitor Filter (SCF) 308 that performs discrete time filtering with three programmable poles at approximately 500 kilohertz (KHz), 270 KHz, and 270 KHz. As further shown in FIG. 3, the SCF 308 of the analog front end 204 feeds the analog back end 206, which includes a continuous time amplifier (CTA) 310 followed by a second order sigma-delta A/D 312.

As noted above, FIG. 3 shows a portion of the circuitry that is used to form the analog front end 204 and the analog back end 206. In particular, the example of FIG. 3 shows one in-phase (I) or quadrature (Q) channel for a single band. In addition to the circuitry shown in FIG. 3, the analog front end 204 may include an additional trans-conductance amplifier and an additional mixer, so that both the I and Q channels from the LNA 302 can be processed. Additionally, the analog front end 204 may include two sets of LNAs that are segregated by band. For example, a first LNA may be used to amplify a high band and a second LNA may be used to amplify a low band. In such an arrangement, a trans-conductance amplifier and a mixer may be provided for each of the I and Q channels for each of the bands, thereby resulting in the use of four trans-conductance amplifiers and four mixers. In such an arrangement, the differential output from the mixer processing the I channel of the high band is combined with the mixer processing the I channel of the low band. Likewise, the differential output from the mixer processing the Q channel of the high band is combined with the mixer processing the Q channel of the low band. The I channel feeds an I SCF and the Q channel feeds a Q SCF. Each of the SCFs provides signals to respective continuous time amplifiers, one of which is shown at reference numeral 310 in FIG. 3. For ease of understanding, the remaining drawings and description simplify the relevant portions of the system to depict a single channel (I or Q) and a single band (high band or low band). Accordingly, only single data and signal paths are shown. Those having ordinary skill in the art, however, are well aware of how to implement the system for multiple channels and bands.

Figure 4:
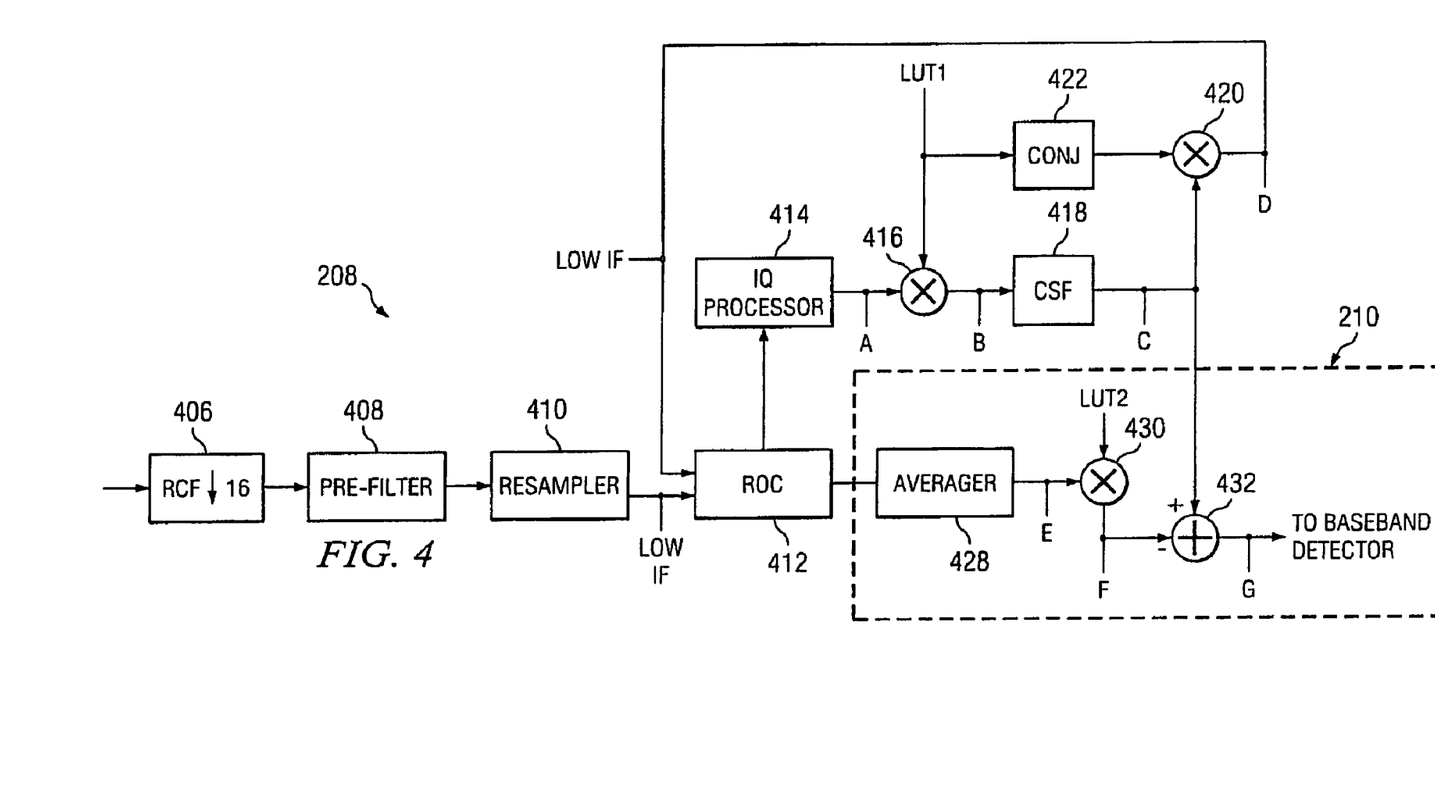
FIG. 4 is a block diagram showing additional detail of the digital receiver and the digital baseband processor of FIG. 2.

FIG. 4 illustrates an example implementation of the digital receiver 208 and a portion of the digital baseband processor 210. In one example, the digital receiver 208 may be implemented using hardware, such as an application specific integrated circuit (ASIC) and the digital baseband processor 210 may be implemented using software or firmware instructions executed by a processor.

The following description of the digital receiver 208 and the digital baseband processor 210 is provided in conjunction with FIGS. 5A-5G, which represent signal spectra at various points or nodes in FIG. 4. A mathematically rigorous development of the digital receiver 208 and the digital baseband processor 210 operation follows. The nodes labeled A-G in FIG. 4 correspond to the spectra shown in FIGS. 5A-5G, respectively. The first stage of the digital receiver 208 is a rate change filter 406 that may be implemented using decimation by a factor of 16 poly-phase filter having a $sinc^4$ response. The output of the rate change filter 406 is coupled to a pre-filter 408 that performs significant filtering before the final filtering performed by a channel selection filter described below. In one example, the pre-filter 408 is implemented as a sixth order infinite impulse response (IIR) filter.

A resampler 410 processes the output of the pre-filter 408, which is a low-IF signal, and passes the resampled signal to the residual offset calculator (ROC) 412. The resampler 410 converts the channel-dependent data rate to a fixed baud-rate dependent rate of 1.08333 MHz for an example case of GSM (Global system for mobile communication). As shown in FIG. 4, the ROC 412 also receives a low-IF signal from another portion of the digital receiver 208 that is described further below. As described in detail below in conjunction with FIG. 6, the ROC 412 processes one of the low-IF signals to determine an amplitude that is related to the DC in the signal from the analog back end 206. The amplitude from the ROC 412 is passed to the baseband processor 210 where the amplitude is averaged and used to generate a signal (e.g., a tone or sinusoidal signal) to null the DC offset in a zero-IF signal. Additionally, the ROC 412 passes either the signal from the resampler 410 or a filtered version thereof to an IQ processor 414.

Figure 5A:
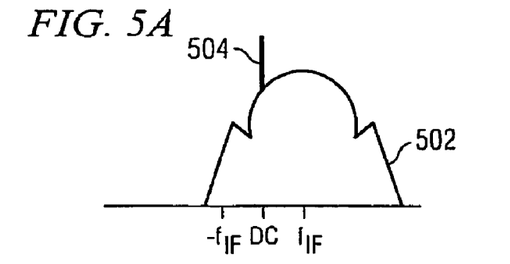
FIGS. 5A-5G represent the spectra of signals present at various points in FIG. 4.

The IQ processor 414 corrects for IQ gain and phase mismatches that may occur in the system. The spectrum of the signal at the output of the IQ processor 414 is shown in FIG. 5A. The x-axis of FIG. 5A represents frequency, wherein the left-most tick mark represent the negative IF frequency, the right-most tick mark represents the positive IF frequency, and the y-axis represents signal amplitude, as well as the amplitude of zero frequency (DC or zero-IF). The receive lineup 200 is a low-IF receiver, thus the spectrum 502 at the output of the IQ processor is centered about the positive IF, which is where the useful communication information of the signal is found and has an undesirable frequency component 504 at zero-IF or DC. This undesirable component will be eliminated before detection in the digital baseband processor 210 by the system shown in FIGS. 4 and 6.

Figure 5B:
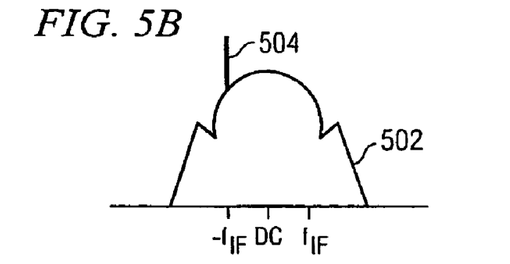

The signal from the IQ processor 414 passes to a mixer 416 that downconverts the low-IF signal to a zero-IF signal by mixing the input signal with a signal that is generated by a first look up table (LUT1). In particular, as shown in FIG. 5B, the spectrum 502 is shown as shifted down in frequency so that the center of the spectrum lies on the DC value (zero-IF) and the undesirable frequency component 504 is at the negative IF. Of course, the spectrum need not be shifted as a whole. In fact, portions of the spectrum could be shifted.

Figure 5C:
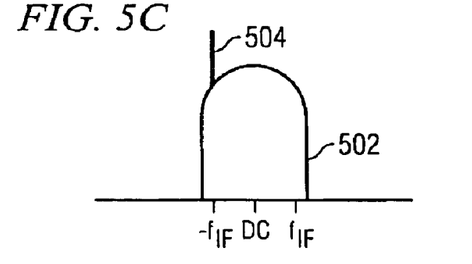

The output of the mixer 416 passes to a CSF (CSF) 418, which filters the zero-IF signal with a passband selecting a single channel. Accordingly, the spectrum 502 at point C, which is shown in FIG. 5C, is similar to that of the pre-filtered spectrum at point B (FIG. 5B), except that the bandwidth of the spectrum shown in FIG. 5C is shaped to select a single channel. However, as shown in FIG. 5C, the undesirable frequency component 504 still resides at the negative IF.

Figure 5D:
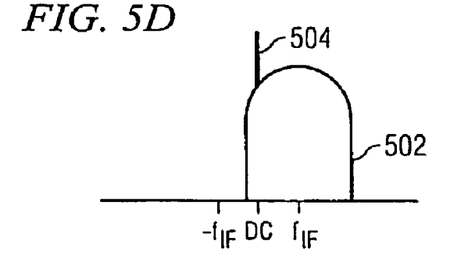

The output of the CSF 418 then passes to a second mixer 420, which converts the zero-IF signal back to a low-IF signal. A conjugator 422 provides the mixer 420 with a complex conjugate of the complex exponential signal at IF frequency produced by the LUT1. The signal spectrum resulting from the mixing is output at point D and is shown in FIG. 5D. As shown in FIG. 5D, the spectrum 502 is now centered about the positive IF and the undesirable frequency component 504 is shown at zero-IF.

Collectively, the mixer 416, the mixer 420, and the conjugator 422 are referred to as a zero-IF block (ZIF). The ZIF performs two complex functions: bringing the low-IF to zero-IF and bringing the output of the CSF 418 back to a low-IF for use in offset estimation at the ROC 412. In addition to feeding the mixer 420, the output of the CSF 418, is coupled to the baseband processor 210. Downsampling and buffering may be provided between the CSF 418 and the baseband processor 210.

A more detailed and mathematically rigorous description of the operation is now provided. Assuming that the composite signal (signal of interest plus DC) at the mixer 416 input is $(x_I+d_I)+j(x_Q+d_Q)$, where $x_I+jx_Q$ is the complex signal and $d_I+jd_Q$ is complex DC. The mixer 416 multiplies this composite signal with $e^{-j\omega_{IF}n/f_s}$, where $\omega_{IF}$ is the low-IF frequency generated by LUT1 and $f_s$ is the sampling frequency at zero-IF (1.08333 MHz). Although the mixer 416 can generate $\pm e^{\pm j\omega_{IF}n/f_s}$, with the option of swapping sine and cosine outputs, the following discussion assumes that the IF carrier is $e^{-j\omega_{IF}n/f_s}$. Similar results will be obtained with all the other phases, polarities, and sine/cosine swapping options.

Assuming the IF frequency to be 100 KHz, after passing through the mixer 416 the DC of $d_I+jd_Q$ is converted to $(d_I+jd_Q) e^{-j\omega_{IF}n/f_s}$, i.e., the DC at zero- IF input is converted to a −100 KHz tone at its output, as shown in FIG. 5B. This output passes through the CSF 418, which performs scaling or attenuation at −100 KHz. Assuming that this attenuation is α, the CSF 418 also introduces some latency, which appears as a phase change (φ) in the −100 KHz signal. The DC component at the input of mixer 416 becomes the following signal at the output of the CSF 418.

$$\alpha(d_I+jd_Q)e^{-j(\omega_{IF}n/f_s-\phi)} \qquad \text{Equation 1}$$

The output of CSF 418 is mixed by the mixer 420 with a second complex exponential that translates the zero-IF signal to a low-IF so that the −100 KHz tone becomes DC again, as shown in FIG. 5D. The DC in this signal may be measured by computing an amplitude mean over data that is one burst long (152 symbols or 608 samples at 4× sampling rate for GSM, for example).

As shown in FIG. 4, the second complex exponential is the complex conjugate of the complex exponential provided by LUT1. During the start-up phase, the LUT1 is set to a known value every time RX Start transitions, which is described in detail below. The complex exponential by which the output of the CSF 418 is multiplied is $e^{j(\omega_{IF}n/f_s)}$ at the mixer 420. The output of the mixer 420 at DC is depicted below in Equation 2.

$$c_I+jc_Q=\alpha(d_I+jd_Q)e^{-j\phi} \qquad \text{Equation 2}$$

This is the estimated DC part of the signal that manifests itself as a −100 KHz tone at the output of the mixer 416. The signal of interest, $x_I+jx_Q$ at the mixer 416 input also passes through the CSF 418 and it will be superimposed on the DC given by the above equation. If the signal part at the output of complex multiplier is denoted by $y_I+jy_Q$, the composite signal at the output of complex multiplier is represented as $(y_I+c_I)+j(y_Q+c_Q)$.

As described below in detail, at the start of a received data burst, the ROC 412 begins to accumulate data output from the mixer 420. This accumulation is then passed to the digital baseband processor 210, which calculates the average over a programmed number of samples (one burst is 608 samples at 4× the baud rate for GSM example). Accordingly, the digital baseband processor 210 generates an estimated value of $c_I+jc_Q$ at the end of averaging operation.

Figure 5E:
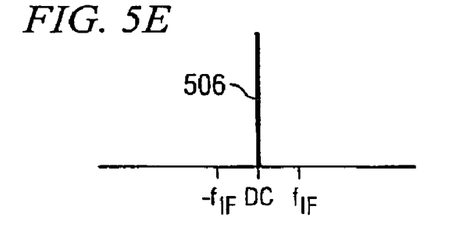

As shown in FIG. 4, the baseband processor 210 includes an averager 428 that receives the output from the ROC 412 that, as described herein, is an accumulation of the signal level over a number of samples of a received data burst. The averager 428 divides the accumulation performed by the ROC 412 by the number of accumulated samples and, thereby, produces a DC signal having the same amplitude as the residual DC component in the signal from the CSF 418. For example, as described in further detail below, the ROC 412 and the averager 428 of the digital baseband processor 210 process either the signal from the mixer 420 (point D) or the signal from the resampler 410 (having a spectrum similar to that of point A) to produce a signal at its output, which is represented at point E and FIG. 5E. As shown in FIG. 5E, the signal output by the ROC 412 is a canceling signal 506 at DC or zero-IF, having an amplitude similar or substantially equal to that of the peak of the undesirable frequency component 504 at the output of the CSF 418.

As noted generally above, the averager 428 receives an accumulation signal from the ROC 412 (the details of the development of an example accumulation signal are provided below in conjunction with FIG. 6, which includes a detailed discussion of the ROC operation) and, based on that accumulation, determines the amplitude of the signal to be used to subtract the undesirable component. A development of the least squares method follows.

Let the data samples at the output of the CSF 418 be represented by the vector y, as shown in Equation 3 below.

$$y=s+b+A_{res,dc}t+n \qquad \text{Equation 3}$$

In Equation 3, s is the modulated signal of interest, b is a blocking signal (the adjacent channel on the lower image side is the most important one), $f_{IF}/N$ is the normalized IF frequency and $t=\exp(j2\pi f_{IF}k/N)$ is the tone representing the residual DC, and n is vector of white noise samples. The letters shown in bolded font in the text represent column vectors. k is a vector containing the time indices from 0 to N-1 where N is the length of the data window captured. $A_{res,dc}$ is the unknown amplitude of residual DC that escapes DC compensation in the prior receiver lineup. To estimate $A_{dc}$, which is the total DC at the output having contributions from the static as well as dynamic parts, both sides of Equation 3 are pre-multiplied by $t^H$, which is a row vector, as shown in Equation 4 below. The result is the projection of y along the vector $t^H$, which is the DC component converted to a 100 KHz tone.

$$A_{dc}=t^H y=t^H(s+b)+A_{res,dc}t^H t+t^H n \qquad \text{Equation 4}$$

$A_{res,dc}$ may be determined using a least squares estimate as shown in Equation 5 below.

$$A_{res,dc}=(t^H t)^{-1}t^H y-(t^H t)^{-1}t^H(s+b)-(t^H t)^{-1}n \qquad \text{Equation 5}$$

As shown in Equation 5 above, there are two other contributors to the energy that falls along the vector $t^H$. One contribution comes from $t^H n$, which is the component of n along the direction of $t^H$. The second contribution comes from the projection of s+b along the direction of $t^H$. Equation 5 reveals that in the absence of the modulated signal s, the blocker b, and the noise n, the least squares (LS) estimate of the DC converted to a 100 KHz tone is $$A_{dc,ideal} = (t^H t)^{-1} t^H y = \frac{1}{N} \sum_{k=0}^{N-1} e^{-j2\pi f_{IF} k/N} y(k) \quad \text{Equation 6}$$

which is the N point discrete Fourier transformation (DFT) of y.

Equation 6 shows that if a tone with amplitude $A_{dc,ideal}$ were to be estimated and subtracted from the output of the CSF 418, there would be no compensation for the projection of s+b on 100 KHz. Accordingly, the total energy of the 100 KHz tone can be estimated by using Equation 6, which will give the projection of all sources contributing to the 100 KHz tone at the output of the CSF 418.

An alternate approach is to up-convert the signal at the output of the CSF 418 by 100 KHz, so that the tone is shifted to DC (See FIG. 5D). An averaging may then be performed by the averager 428 at DC to estimate the magnitude of DC component. The DFT at that frequency essentially performs this operation.

Figure 5F:
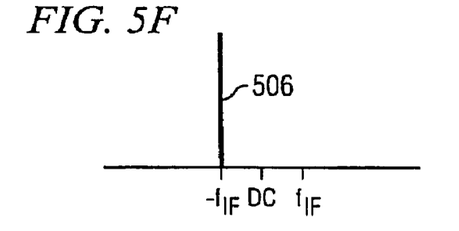

The amplitude developed by the averager 428 (See, FIG. 5E) is coupled to the mixer 430, which receives another input from a second look up table (LUT2) that generates a complex exponential signal at IF frequency for the mixer 430. Accordingly, as shown in FIG. 5F, the mixer 430 translates the canceling signal 506 negatively in frequency to a tone so that the canceling signal (or tone) resides at the negative IF, which is where the undesirable component in the zero-IF signal resides (see FIG. 5C). The output of the mixer 430 is a tone having the same amplitude and frequency as the residual or undesirable components in the output of the CSF 418. The phase of the canceling signal 506 can be easily controlled via the LUT2. The sinusoidal signal feeding the mixer 430 can either be generated using the LUT2 (shown in FIG. 4), or can be generated using a digital resonator. The phase of the canceling signal or tone 506 is substantially equal to the phase of the undesired frequency component 504 and is based on a priori knowledge of the phase of the undesired frequency component.

Figure 5G:
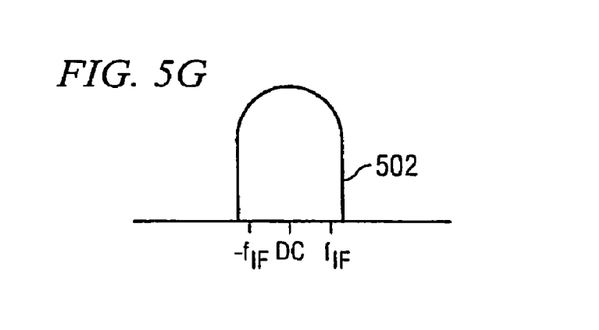

The signal from the mixer 430 and the signal from the CSF 418, which is the zero-IF signal including the undesirable component at the negative IF as shown in FIG. 5C, are coupled to a subtractor 432. The subtractor 432 subtracts the signal from the mixer 430 from the signal output by the CSF 418 in the baseband to produce a baseband signal, from which the DC component has been eliminated or substantially eliminated, that can undergo detection. Point G in FIG. 4 represents the output of the subtractor 432. As shown in FIG. 5G, the spectrum 502 is centered about DC (zero-IF) and has no undesirable component. In other words, the spectrum output from the subtractor 432 is substantially equal to the spectrum at point C, except that the undesirable frequency component 504 has been removed. The undesirable frequency component 504 is estimated and removed based on an actual burst-data measurement, thereby increasing the accuracy of the system.

The baseband processor 210 software stores and operates on the entire burst. To eliminate the DC component, the digital baseband processor 210 estimates $c_I + jc_Q$ and subtracts a tone of this amplitude from the data in its buffer (i.e., the stored samples of the intermediate frequency signal.)

The complex exponential generated in the digital baseband processor 210 is given by $e^{-(j\omega_{IF} n/f_s) + \delta}$, where $f_s$ is the sampling frequency at this point in the digital baseband processor 210 and $\delta$ is the initial phase of this complex exponential. To cancel the −100 KHz tone at the CSF 418 output, the requirement for the digital baseband processor 210 complex exponential is that the relationship between cosine and sine outputs should be the same as in the LUT1. Also for proper cancellation, the initial phases of the sine waves generated in the LUT1 and the LUT2 should match. The entries of the LUT2 may be generated by copying the entries in the LUT1. It is also possible to generate sine and cosine signals in the digital baseband processor 210 using non-LUT methods, for example, using Goertzel's algorithm.

The accumulation of data inside ROC creates a window function having a main lobe $2f_s/N$ Hz wide, where N is the number of samples accumulated and $f_s$ is the sampling frequency at this point in data path. The side lobe of the window is only 13 dB below the peak of the main lobe, however, the IIR transfer function helps by band limiting noise.

Figure 6:
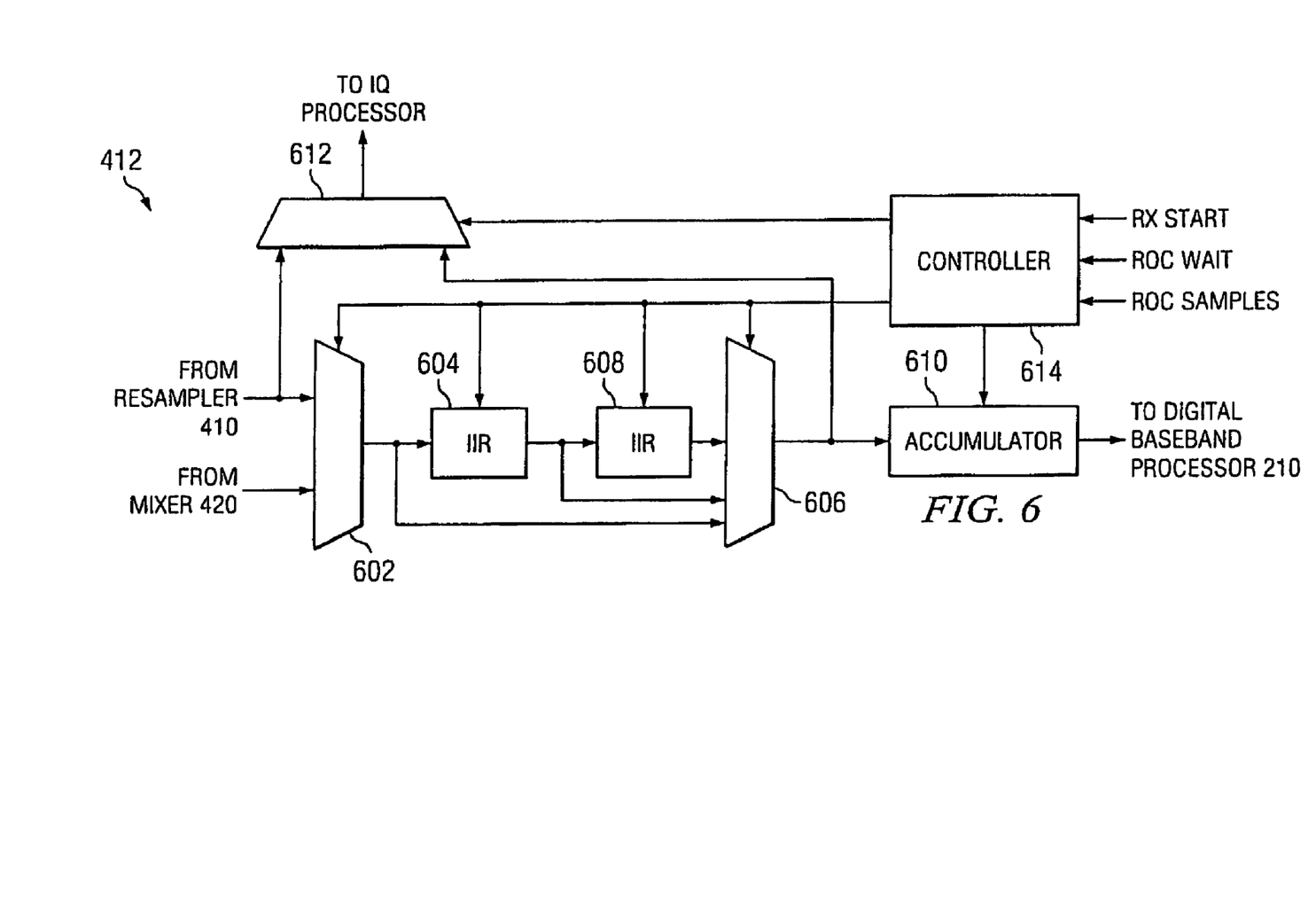
FIG. 6 is a block diagram showing additional detail of the residual offset calculator of FIG. 4.

Further detail regarding the ROC 412 is shown in FIG. 6. As noted previously, the ROC 412 may be implemented as part of the digital receiver 208, as an ASIC, as software or firmware executed on hardware, or any combination thereof. In one example, the ROC 412 includes a first multiplexer 602 that is controlled to select between the low-IF signal from the mixer 420 and the output of the resampler 410. The output of the first multiplexer 602 is coupled to a first IIR filter 604, as well as to a second multiplexer 606. The first IIR filter 604 is coupled to a second IIR filter 608 and the second multiplexer 606. The second multiplexer 606 is controlled to output one of its inputs. The output of the second multiplexer 606 is coupled to an accumulator 610 that computes the sum of the signal output from the second multiplexer 606 over a programmable number of samples. The second multiplexer 606 is coupled to the digital baseband processor 210, as shown in FIG. 4.

The ROC 412 also includes a third multiplexer 612 that receives signals from the resampler 410 and the output of the second multiplexer 606. The third multiplexer 612 is controlled to select one of its input signals to be coupled to the IQ processor 414. For example, the signal provided by the resampler 410 may be coupled to the IQ processor 414 so that the mixer 416 can operate on the input signal.

The ROC 412 includes a controller 614 to regulate the operation of the multiplexers 602, 606, and 612; the IIR filters 604, 608; and the accumulator 610. The IIR filters 604, 608 in an example implementation have the following transfer function:

$$H_{IIR} = \frac{2^{-K}}{1 - (1 - 2^{-K})z^{-1}},$$

where K is an integer, greater than 1, that determines the corner frequency of IIR filter. The IIR filters 604, 608 have programmable passbands and filtering characteristics that are substantially free from discontinuities when the filter characteristics are changed. In one particular example, the IIR filters 604, 608 may be configured to begin the filtering procedure from a predefined starting point (i.e., an initial pre-defined frequency response).

In operation, the controller 614 may program the first multiplexer 602 to select the signal from the mixer 420. Additionally, the controller 614 may program each of the IIR filters 604, 608 to be active. In such an arrangement, the second multiplexer 606 is controlled to output the signal from the second IIR filter 608 to the accumulator 610. Further, the third multiplexer 612 may be programmed to output the signal provided to the accumulator 610 and to provide the same to the IQ processor 414.

With regard control of the accumulator 610, the controller 614 clears the accumulator 610 when RX Start, which is a signal that represents the reception of a data burst, transitions from a low state to a high state. The controller 614 then instructs the accumulator 610 to wait a number of clock cycles before accumulating data. The variable ROC Samples represents the number of samples that are accumulated. ROC Samples is defined as (ROC Accumulator End)-(ROC Accumulator Start). Note that in one example, both ROC Accumulator Start and ROC Accumulator End are stored in programmable 12-bit registers and the accumulator value is stored in a 26-bit register as signed 2's complement number. In one example implementation, there is one register for the I channel and one register for the Q channel. It may be necessary for implementation reasons, to restrict the value of ROC Accumulator Start to a value greater than one. However, as described below with respect to FIG. 7, because the accumulation operation is likely performed over the mid-amble, this is not a major restriction.

At the end of accumulation, the accumulator 610 holds the value of the accumulated value of the ROC Samples until the next low state to high state transition of RX Start signal. That is, until the next data burst starts.

After accumulation has stopped, the controller 614 directs the accumulator 610 to pass to the digital baseband processor 210 the amplitude estimate that is averaged over the number of samples over which accumulation took place to produce a signal used to subtract a sinusoid generated internally in the digital baseband processor 210. The averager 428 of the digital baseband processor 210 operates as described above.

Figure 7:
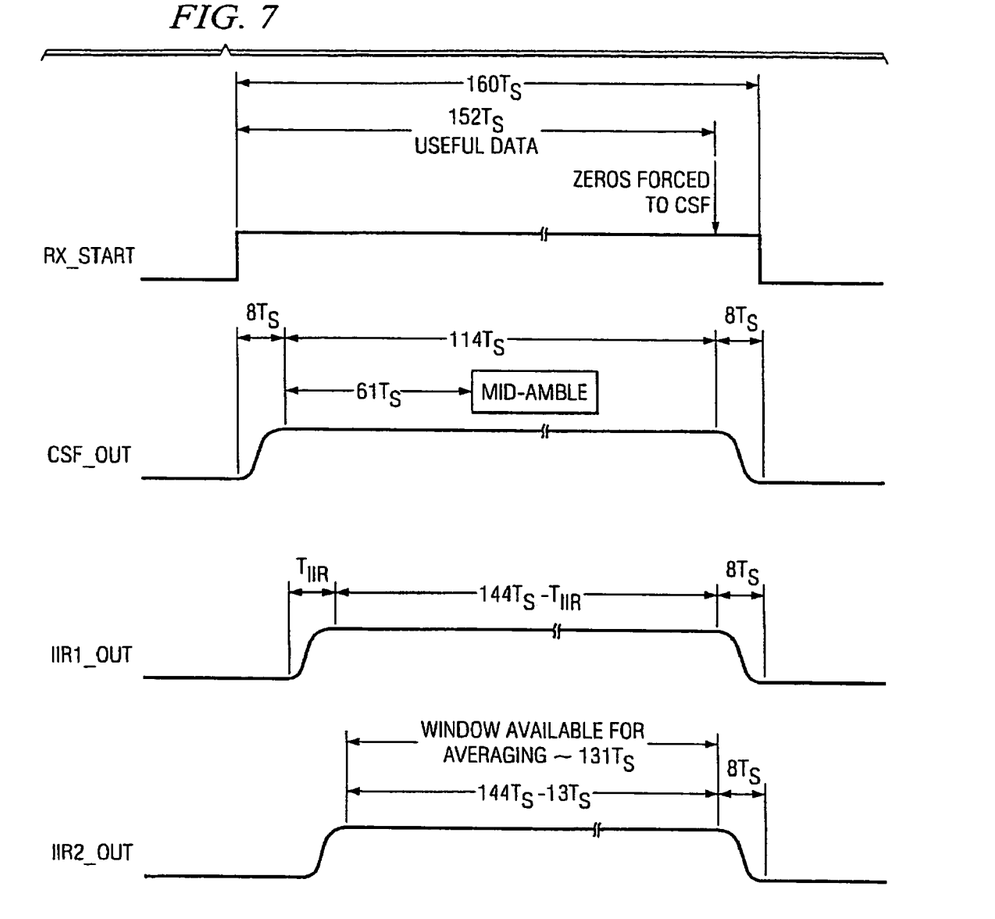
FIG. 7 is a timing diagram of various signals within the system shown in FIGS. 4 and 6.

FIG. 7 shows the window size available for performing an averaging operation. The operation of the controller 614 is governed by its input signals and the controller 614 operates the accumulator 610 in response thereto. In FIG. 7, Ts represents the global system for mobile communications (GSM) symbol time, i.e., 3.69 microseconds (μsec). The CSF 418 has a latency of approximately 32 samples at 4×clock (i.e., four times the baud rate of GSM used to process received data), which is equivalent to 8 Ts. Each IIR stage 604, 608 has a default K value of 3, which results in a 99% settling time of approximately 35 samples at 4×clock. For two IIR filters 604, 608 in series, the combined settling time is approximately 50 samples, which is roughly 13 Ts. With the two IIR filters in path, the available window size left for computing an average over a burst is reduced to approximately (152−8−13)×Ts=131 Ts. Accordingly, the ROC 412 may accumulate amplitudes over these samples and the average is calculated using the same number of samples.

With reference to FIGS. 4 and 6, the interaction of the ROC 412 and the remainder of the digital receiver 208 is explained. The low state to high state transition of RX Start sets phase of the LUT1 to a known value. Additionally, the sine output of the LUT1 is inverted (multiplied by −1) by the conjugator 422 before the complex multiplication takes place at the mixer 420. This is because the complex exponential feeding the mixer 420 should be a complex conjugate of the complex exponential produced by the LUT1 feeding the mixer 416 that shifts the low-IF signal to DC.

In one example, the ROC 412 operates at 4×clock. The filtering offered by the data in the accumulator has a sinc shape having a main-lobe width of 2fs/ROC Samples Hz. The attenuation offered by the side-lobe is 13 dB below the peak of the main lobe.

The offset rejection capability of a digital offset is determined by the length of the data window over which the offset is computed. In the absence of any window, a rectangular window may be applied. The characteristics of the rectangular window are such that the width of the main lobe is approximately 2fs/N where N is the number of samples and fs is the sampling frequency. The peak side lobes decay very slowly and are only 13 dB lower.

As noted previously, the disclosed system measures offset during a data burst and then corrects the offset during that data burst. When averaging over 160 symbols sampled at a 1× rate, the width of the main lobe is 270/80 KHz=3.38 KHz, while the noise is limited to the signal bandwidth and is smallest in the entire receive lineup 200.

As noted previously, the foregoing describes the operation of the ROC 412 when the signal from the mixer 420 is selected for processing and accumulated in the ROC 412. However, a number of alternative techniques based on signals other than those from the mixer 420 are also contemplated.

One example alternate technique includes taking the ROC 412 input from the output of the CSF 418. In this example, the output of the CSF 418 is used to estimate the offset. This has the disadvantage that the latency of the CSF 418 will add to the time it takes to complete estimation. The advantage is that DC is estimated at the point after which the data sees no other manipulation before being handed off to the digital baseband processor 210. The data at the CSF 418 output has no interferers and the noise bandwidth is constrained to only the channel of interest. However, by itself this is not enough as the channel of interest sees no filtering and appears as an interferer in DC estimation. The CSF 418 transfer function can also attenuate the residual DC that manifests as a 100 KHz tone. This point offers the advantage that no correction factor is needed in the digital baseband processor 210 to account for the CSF 418 transfer function at 100 KHz.

In another arrangement, the output of the resampler 410 may be selected by the controller 614 for ROC 412 processing via the first multiplexer 602. The filtering of the 100 KHz tone by the CSF 418 is not comprehended in this estimation mode and a correction factor must be applied by the digital baseband processor 210 to make this estimate. The data source at this point is noisier than the CSF 418 output. However, the latency of the CSF 418 is avoided and the result is available sooner.

As noted previously, one or more IIR filters in the ROC 412 may be used. Different types of modulated data signals were passed through the alternative ROC modes and the total power at the output of the second IIR 608 was compared. This power represents the total interferer power on which the subsequent averaging operation runs; the lower the value of this power, the better the averaging estimate, given the same window for averaging. Table 1 provides the interferer power numbers for four possible modes of the ROC 412: (1) output taken from the resampler 410 using one IIR filter; (2) output taken from the resampler 410 using two IIR filters; (3) output taken from the CSF 418 using one IIR filter; and (4) output taken from the CSF 418 using two IIR filters. When simulating each of these modes, the modulated signal of interest was set at −87 decibels above a milliwatt (dBm) at the LNA 302 input, the first adjacent interferer was set 9 dB higher, the second adjacent interferer was set 41 dB higher, and the third adjacent interferer was set 49 dB higher than the signal of interest. An overall gain of 47 dB (CTA gain 310 of 11 dB) and a noise figure (NF) of 5.5 dB was used for these simulations. The results show that the ROC configuration at the CSF 418 output with two IIR filter stages outperforms the other three alternative approaches. This is particularly true for adjacent interferers on the image side (negative side) of the signal of interest.

TABLE 1

Comparison of Interferer power at IIR output

| Type of Composite Signal | RES + 1 IIR | RES + 2 IIRs | CSF + 1 IIR | CSF + 2 IIRs |
|---|---|---|---|---|
| Signal + 3rd adjacent (negative side) | −40.06 | −60.09 | −59.72 | −64.46 |
| Signal + 2nd adjacent (negative side) | −30.76 | −50.73 | −59.53 | −63.81 |
| Signal + 1st adjacent (negative side) | −49.78 | −53.7 | −56.29 | −58.33 |
| Signal only | −59.23 | −63.27 | −59.78 | −64.38 |
| Signal + 1st adjacent (positive side) | −57.6 | −63.12 | −59.6 | −64.3 |
| Signal + 2nd adjacent (positive side) | −47.76 | −62.59 | −59.82 | −64.38 |
| Signal + 3rd adjacent (positive side) | −59.25 | −63.21 | −59.84 | −64.35 |

Table 2 gives the available window size for computing an average for the four possible configurations described above.

TABLE 2

| Estimation Method | Start of useful data w.r.t. start of burst (Units of $T_s$) | Maximum available window size for averaging ($T_s$) |
|---|---|---|
| RES + 1 IIR | 9 | 143 |
| RES + 2 IIRs | 13 | 139 |
| CSF + 1 IIR | 9 | 135 |
| CSF + 2 IIRs (Proposed) | 13 | 131 |

The midamble in a GSM packet contains training data. If it is desirable to perform averaging over the midamble only, then a few considerations need to be discussed here.

One advantage of averaging at the resampler 410 output is that because the CSF 418 is not serially interposed in the data path, the CSF 418 latency is avoided and the result of accumulation is available within ~1-2 $T_s$ after the end of the midamble. In case of the CSF 418 based accumulation, there will an additional delay of 8 $T_s$ before the result of accumulation is available.

Also, because the midamble starts 61 symbols after the start of a received data packet for the example case of GSM, a settling time of ~61 $T_s$ is allowed for all filters. 61 $T_s$ corresponds to 244 samples at 4×clock, which means that the K value of the IIR filters 604, 608 can be increased. As an example, a first order IIR with K=4 requires approximately 75 samples to reach to 99% of its final value. If K=4 for both IIRs 604, 608, then the settling time for CSF 418 based arrangement is approximately 182 samples and for resampler 410 based arrangement, it is approximately 150 samples.

For a resampler 410 based configuration, it is also possible to set one IIR to have a K of 5 (with an overall settling time of ~230 samples). It has been shown that the CSF 418 with two IIRs at K=4 operates very well.

Figure 8:
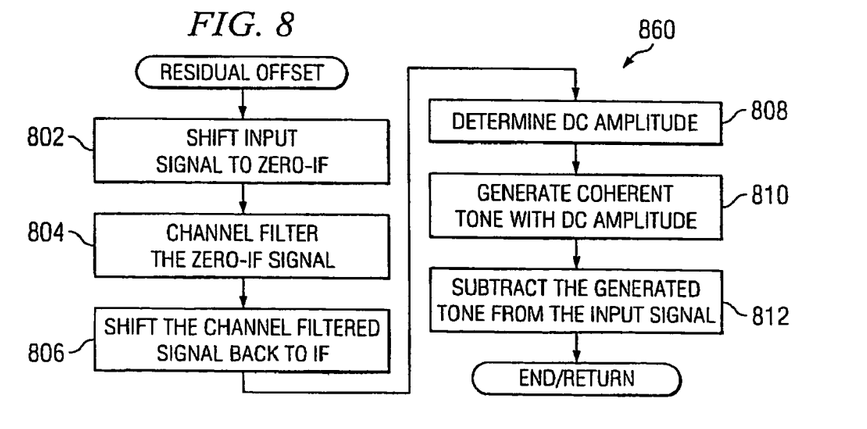
FIG. 8 is a flow diagram of a residual offset removal process that may be carried out by one or more of the digital receiver and the digital baseband processor of FIGS. 2 and 4.

As noted previously, the system shown in FIG. 4 could be implemented in hardware, or firmware or software executed on hardware, such as a processor. FIG. 8 shows a flow diagram of a residual offset removal process 800 that is carried out to implement the disclosed system, whether such a process is implemented in hardware or software/firmware instructions executed by a processor. The process 800 first frequency shifts the input signal to a zero-IF (block 802) (See FIG. 5B). The zero-IF signal is then channel filtered to ensure that signal information associated with one channel remains (block 804) (See FIG. 5C). After the channel filtering, the signal is shifted back to its original IF (block 806) (See FIG. 5D).

After the signal is shifted back to its original IF (block 806), the DC value of the signal is determined (block 808) (See FIG. 5E) and a coherent tone is generated with the DC amplitude (block 810). The generated tone is then subtracted from the signal to be detected (block 812) (See FIG. 5G). Accordingly, at the completion of the process 800, the signal to be detected has had the undesirable component removed therefrom by a coherent tone.

Of course, other permutations of the process 800 are possible. For example, it is possible to forgo the parts of the process shown in blocks 802-806, in favor of processing an input signal with the use of channel filtering. Accordingly, it is possible that a spectrum such as that shown in FIG. 5A may be processed to determine its DC value, which is then used to generate a coherent tone for subtracting from that same signal. The result being a spectrum such as that depicted in FIG. 5A, except that the undesirable component is removed. The resulting spectrum, having the undesirable component removed, could be shifted and channel filtered to result in a zero-IF signal having no undesirable component. Alternatively, the DC value could be determined without shifting and channel filtering, but the coherent tone could be subtracted from the channel filtered signal to remove the undesirable component therefrom.

Although certain apparatus constructed in accordance with the teachings of the invention have been described herein, the scope of coverage of this patent is not limited thereto. On the contrary, this patent covers every apparatus, method and article of manufacture fairly falling within the scope of the appended claims either literally or under the doctrine of equivalents.

Additionally, although the foregoing discloses example systems including, among other components, software executed on hardware, it should be noted that such systems are merely illustrative and should not be considered as limiting. For example, it is contemplated that any or all of these hardware and software components could be embodied exclusively in dedicated hardware, exclusively in software, exclusively in firmware or in some combination of hardware, firmware and/or software. Accordingly, while the following describes example systems, persons of ordinary skill in the art will readily appreciate that the examples are not the only way to implement such systems.

What is claimed is:

1. A method of removing an undesired frequency component from an intermediate frequency signal having an intermediate center frequency, the method comprising:
   frequency shifting the intermediate frequency signal to a zero-intermediate frequency signal having the undesired frequency component at a first frequency;
   filtering the zero-intermediate frequency signal to produce a filtered zero-intermediate frequency signal having the undesired frequency component at the first frequency;
   frequency shifting the filtered zero-intermediate frequency signal to produce a filtered intermediate frequency signal having the undesired frequency component at a second frequency;
   determining an amplitude of the undesired frequency component in the filtered intermediate frequency signal;

generating a canceling signal at the first frequency based on the amplitude of the undesired frequency component; and subtracting the canceling signal from the filtered zero-intermediate frequency signal to remove the undesired frequency component.

2. A method as defined by claim 1, wherein determining the amplitude of the undesired frequency component comprises determining an average amplitude of the filtered intermediate frequency signal.

3. A method as defined by claim 2, wherein determining the average amplitude comprises sampling to accumulate during a received data burst an amplitude of the filtered intermediate frequency signal and dividing the accumulated amplitude by a number of samples over which the accumulation was taken.

4. A method as defined by claim 3, wherein determining the average amplitude comprises performing a least squares determination.

5. A method as defined by claim 1, wherein the filtering is performed using a filter having a programmable passband.

6. A method as defined by claim 5, wherein the filter comprises a filtering characteristic that is substantially free from discontinuities when the filter characteristics are changed.

7. A method as defined by claim 5, wherein the filter is configured to begin a filtering procedure from a predefined starting point.

8. A method as defined by claim 1, wherein subtracting the canceling signal comprises storing samples of the filtered intermediate frequency signal.

9. A method as defined by claim 1, wherein the amplitude of the undesired frequency component is determined when the undesired frequency component is shifted to a direct current (DC) frequency.

10. A method as defined by claim 1, wherein the subtraction is performed after the undesired frequency component is shifted to the first frequency by a down-conversion process.

11. A method as defined by claim 10, wherein the phase of the canceling signal is substantially equal to the phase of the undesired frequency component.

12. A method as defined by claim 11, wherein the phase of the canceling signal is determined based on a priori knowledge of the phase of the undesired frequency component.

13. A method as defined by claim 1, wherein the generating the canceling signal and the subtraction of the canceling signal from the filtered zero-intermediate frequency signal is performed at baseband frequencies.

14. A method as defined by claim 1, wherein generating the canceling signal is performed using a look up table or a digital resonator.

15. A method as defined by claim 1, wherein the intermediate frequency signal is rate translated prior to determining the amplitude of the undesired frequency component.

16. An article of manufacture comprising a tangible machine-readable medium storing a plurality of computer executable instructions that, when executed, cause a computer to:

frequency shift the intermediate frequency signal to a zero-intermediate frequency signal having the undesired frequency component at a first frequency;

filter the zero-intermediate frequency signal to produce a filtered zero-intermediate frequency signal having the undesired frequency component at the first frequency;

frequency shift the filtered zero-intermediate frequency signal to produce a filtered intermediate frequency signal having the undesired frequency component at a second frequency;

determine an amplitude of an undesired frequency component in the filtered intermediate frequency signal;

generate a canceling signal at the first frequency based on the amplitude of the undesired frequency component; and subtract the canceling signal from the filtered zero-intermediate frequency signal to remove the undesired frequency component.

17. A machine readable medium as defined by claim 16, wherein the plurality of machine accessible instructions, when executed, cause a machine to determine the amplitude of the undesired frequency component by determining an average amplitude of the filtered intermediate frequency signal.

18. A machine readable medium as defined by claim 17, wherein the plurality of machine accessible instructions, when executed, cause a machine to determine the average amplitude by sampling to accumulate during a received data burst an amplitude of the filtered intermediate frequency signal and dividing the accumulated amplitude by a number of samples over which the accumulation was taken.

19. A machine readable medium as defined by claim 16, wherein the plurality of machine accessible instructions, when executed, cause a machine to subtract the canceling signal by storing samples of the filtered intermediate frequency signal.

20. A machine readable medium as defined by claim 16, wherein the phase of the canceling signal is substantially equal to the phase of the undesired frequency component.

21. An apparatus to remove an undesired frequency component from an intermediate frequency signal having an intermediate center frequency, comprising:

a first mixer to frequency shift the intermediate frequency signal to move the undesired frequency component from a first frequency to a second frequency, thereby creating a zero-intermediate frequency signal;

a filter coupled to the first mixer to filter the zero-intermediate frequency signal;

a second mixer to frequency shift the filtered frequency shifted intermediate frequency signal to move the undesired frequency component from the second frequency to the first frequency, thereby creating a filtered intermediate frequency signal;

a residual offset calculator coupled to an output of the second mixer, wherein an output of the residual offset calculator is processed to determine an amplitude of the undesired frequency component;

a third mixer to generate a canceling signal at the second frequency based on the amplitude of the undesired frequency component; and a subtractor to subtract the canceling signal from the filtered zero-intermediate frequency signal to remove the undesired frequency component.

22. An apparatus as defined by claim 21, wherein the output of the residual offset calculator is averaged to determine the amplitude of the undesired frequency component.

23. An apparatus as defined by claim 22, wherein the residual offset calculator accumulates during a received data burst an amplitude of the intermediate frequency signal.

* * * * *